(12) United States Patent  (10) Patent No.: US 7,528,621 B2
Bhatti  (45) Date of Patent: May 5, 2009

(54) PACKAGED CIRCUIT MODULE FOR IMPROVED INSTALLATION AND OPERATION

(75) Inventor: Irfan A. Bhatti, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 11/592,348

(22) Filed: Nov. 3, 2006

(65) Prior Publication Data

US 2007/0052437 A1  Mar. 8, 2007

(51) Int. Cl.
*G01R 31/26* (2006.01)
(52) U.S. Cl. ..................................... 324/765
(58) Field of Classification Search ........................ None
See application file for complete search history.

(56) References Cited

U.S. PATENT DOCUMENTS

| | | | |
|---|---|---|---|
| 4,322,119 A | 3/1982 | Baker | |
| 4,511,201 A | 4/1985 | Baker et al. | |
| 4,810,956 A * | 3/1989 | Hvezda et al. | 324/754 |
| 4,812,949 A | 3/1989 | Fontan et al. | |
| 4,826,440 A | 5/1989 | Plocek et al. | |
| 4,875,457 A | 10/1989 | Fitzner | |
| 4,949,224 A | 8/1990 | Yamamura et al. | |
| 5,196,750 A * | 3/1993 | Strobl | 310/239 |
| 5,559,445 A | 9/1996 | Eaddy et al. | |
| 5,802,707 A | 9/1998 | Brownell et al. | |
| 6,043,991 A | 3/2000 | Sorrentino | |
| 6,301,111 B1 | 10/2001 | Katsui | |
| 6,305,953 B1 | 10/2001 | Shi et al. | |
| 6,307,344 B1 | 10/2001 | Pajak et al. | |
| 6,319,026 B1 | 11/2001 | Chen et al. | |
| 6,328,603 B1 | 12/2001 | Chang | |
| 6,347,962 B1 | 2/2002 | Kline | |
| 6,349,465 B1 | 2/2002 | Brownell et al. | |
| 6,445,201 B1 | 9/2002 | Simizu et al. | |
| 6,474,999 B1 | 11/2002 | Givens et al. | |
| 6,648,657 B1 | 11/2003 | Korsunsky et al. | |
| 6,685,486 B1 | 2/2004 | Zhang et al. | |
| 6,703,702 B2 | 3/2004 | Inoue et al. | |
| 6,888,062 B1 * | 5/2005 | Erickson et al. | 174/359 |

(Continued)

OTHER PUBLICATIONS

Presentation X2Y Technology for Connectors, Phicomp a Yageo Company; http://www.yageo.com/pdf/x2y%20in%20connectors.pdf; Mar. 18, 2003.

(Continued)

*Primary Examiner*—Jermele M Hollington
(74) *Attorney, Agent, or Firm*—Michael Best & Friedrich LLP

(57) ABSTRACT

An EMI suppressive device. In one embodiment, the EMI suppressive device is electrically connected to an electric motor having a substantially non-conductive shroud and a conductive drive shaft. The EMI suppressive device includes a packaged circuit that suppresses electromagnetic interference and contains one or more signal terminals that connect to the electric motor and one or more ground terminals that connect to ground. The EMI suppressive device also includes a bracket that supports the packaged circuit and has one or more interfaces that interface with one or more of the one or more ground terminals of the packaged circuit, and a conductive element that contacts the shroud and electrically connects to the drive shaft to provide a path to ground.

20 Claims, 4 Drawing Sheets

U.S. PATENT DOCUMENTS

| | | | |
|---|---|---|---|
| 7,018,240 B2 * | 3/2006 | Bourdykina et al. | 439/620.02 |
| 7,141,899 B2 * | 11/2006 | Anthony et al. | 310/68 R |
| 7,142,001 B2 * | 11/2006 | Bhatti | 324/765 |
| 7,162,388 B2 * | 1/2007 | Johannes et al. | 702/156 |
| 7,463,048 B2 * | 12/2008 | Bhatti | 324/765 |
| 2003/0132520 A1 | 7/2003 | Watanabe et al. | |
| 2003/0159122 A1 | 8/2003 | Iida et al. | |
| 2005/0239331 A1 * | 10/2005 | Bourdykina et al. | 439/622 |
| 2006/0017454 A1 * | 1/2006 | Bhatti | 324/765 |
| 2007/0046315 A1 * | 3/2007 | Bhatti | 324/765 |

OTHER PUBLICATIONS

Presentation X2Y® Technology for connectors, Phicomp a Yageo Company; http://www.yageo.com/pdf/X2y%20In%20Connectors.Pdf; Mar. 18, 2003.

* cited by examiner

PACKAGED CIRCUIT MODULE FOR IMPROVED INSTALLATION AND OPERATION

RELATED APPLICATION

This application claims priority to U.S. patent application Ser. No. 10/886,145, filed on Jul. 7, 2004, now U.S. Pat. No. 7,142,001, the entire contents of which are incorporated herein by reference.

FIELD

Embodiments of the invention generally relate to a module that includes a packaged circuit or a chip. In particular, embodiments of the invention provide a packaged circuit module the provides improved connections and easier installation.

BACKGROUND

Packaged circuits including integrated circuits (which are sometimes called "chips") are used in a variety of applications. Packaged circuits may be used in environments subjected to a variety of phenomena that can affect the operation of the circuit. For example, packaged circuits used in automobiles may be susceptible to vibrations from the vehicle, electromagnetic interference ("EMI") from electric motors used in power accessories, and large temperature changes.

Maintaining packaged circuits may also be difficult. Repairing or replacing a packaged circuit may include removing old soldered connections and/or wires and soldering new connections between the packaged circuit and one or more interfacing components and may be costly in both time and materials. Packaged circuits may also be located in small, tight positions further increasing the difficulty of repairing or replacing them and providing the connections needed for proper functioning.

SUMMARY

In one embodiment, the invention provides a packaged circuit or chip module that includes a packaged circuit containing a plurality of first terminals, and a circuit board supporting the packaged circuit and containing a plurality of secondary terminals and a plurality of terminal traces leading from one or more of the plurality of first terminals to one or more of the plurality secondary terminals. The packaged circuit module may also comprise a bracket configured to support the circuit board and to interface with one or more of the plurality of first terminals.

In another embodiment, the invention provides an interference suppression module that includes a packaged circuit containing one or more terminals configured to be connected to a remote device and one or more ground terminals configured to be connected to ground. The module also includes a circuit board supporting the packaged circuit and containing terminal traces leading from the one or more terminals to one or more secondary terminals and a bracket configured to support the circuit board and to interface with one or more of the one or more ground terminals.

In yet another embodiment, the invention provides a system of suppressing interference generated by a device. The system includes a packaged circuit configured to suppress interference. The system also includes one or more terminals configured to be connected to the device and one or more ground terminals configured to be connected to ground; a circuit board containing the packaged circuit and terminal traces leading from the one or more terminals to one or more secondary terminals; and a bracket configured to support the circuit board and to interface with one or more of the one or more ground terminals.

In yet another embodiment, an EMI suppressive device configured to be electrically connected to an electric motor includes a substantially non-conductive shroud and a conductive drive shaft. The device also includes a packaged circuit that is configured to suppress electromagnetic interference. The packaged circuit contains one or more signal terminals configured to be connected to the electric motor and one or more ground terminals configured to be connected to ground. A bracket is configured to support the packaged circuit and has one or more terminals configured to interface with one or more of the one or more ground terminals of the packaged circuit. The bracket also has a top support configured to contact the shroud and electrically connect to the drive shaft to provide a path to ground.

Another embodiment provides An EMI suppressive device that can be electrically connected to an electric motor having a substantially non-conductive shroud and a conductive drive shaft. The EMI suppressive device includes a packaged circuit that suppresses electromagnetic interference and contains one or more signal terminals that are connected to the electric motor and one or more ground terminals that are connected to ground. The EMI suppressive device also includes a bracket that supports the packaged circuit and has one or more interfaces that interface with one or more of the one or more ground terminals of the packaged circuit, and a conductive element that contacts the shroud and electrically connects to the drive shaft to provide a path to ground.

Another embodiment provides an EMI suppressive device that can be electrically connected to an electric motor having a substantially non-conductive shroud and a conductive retainer. The EMI suppressive device includes a packaged circuit, a circuit board, and a bracket. The packaged circuit suppresses electromagnetic interference and contains one or more signal terminals that connect to the electric motor and one or more ground terminals that connect to ground. The circuit board supports the packaged circuit and contains electrical links leading from the one or more signal terminals to one or more secondary terminals. The bracket supports the circuit board and has one or more clips that interface with one or more of the one or more ground terminals of the packaged circuit, and a conductive element that contacts the shroud and the conductive retainer to provide a path to ground.

Another embodiment provides a packaged circuit module that can be electrically connected to an electric motor having a substantially non-conductive shroud and a conductive retainer. The packaged circuit module includes a packaged circuit, a first interface terminal, and a bracket. The packaged circuit suppresses electromagnetic interference and contains one or more signal terminals that connect to the electric motor and one or more ground terminals that connect to ground. The first interface terminal electrically connects to one of the one or more signal terminals of the packaged circuit and connects to a first terminal of a motor. The bracket connects to one of the one or more ground terminals of the packaged circuit and to a ground. The bracket also has first and second legs and a conductive element that snaps onto the shroud and contacts the conductive retainer to provide a path to ground.

These and other embodiments, features, and aspects of the invention will become apparent upon review of the drawings and description.

BRIEF DESCRIPTION OF THE DRAWINGS

In the drawings:

FIG. 6b is a detailed view of the bracket of FIG. 6a.

DETAILED DESCRIPTION

Figure 1:
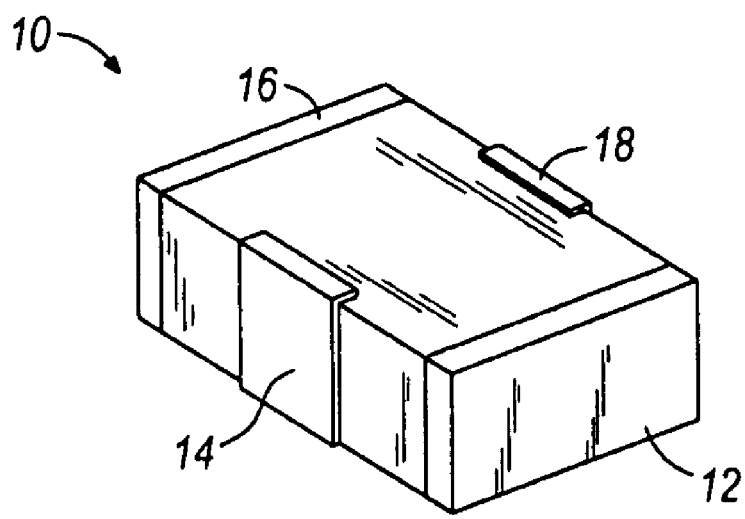
FIG. 1 illustrates an exemplary embodiment of a packaged circuit.

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

FIG. 1 illustrates an exemplary packaged circuit 10. The packaged circuit 10 could be an integrated circuit manufactured on a semiconductor, a miniaturized circuit, or an encapsulated circuit. The exemplary packaged circuit 10 has four terminals 12, 14, 16, and 18. Other circuits could have a different number of terminals. Each terminal 12, 14, 16, and 18 is located on one side of the packaged circuit 10. Each terminal may be configured to transmit or receive signals. Each terminal may be an input terminal, an output terminal, an input/output terminal, a ground terminal, a power terminal, a signal terminal, or any other type of terminal. In some embodiments terminals on opposite sides, for example, terminals 14 and 18, are ground terminals, while terminals 16 and 12 are power terminals and designed to be connected to a remote device such as a power supply. In some embodiments, for example, the terminal 16 is a positive terminal and the terminal 12 is a negative terminal that allows current to flow through the packaged circuit 10. The positive and negative terminals may also be reversed making the terminal 16 the negative terminal and the terminal 12 the positive terminal.

The packaged circuit 10 may be configured with various processing capabilities. For example, the packaged circuit 10 may be configured to filter or otherwise reduce the impact of electromagnetic interference generated by an electric motor. In one embodiment, the packaged circuit 10 takes the form of an X2Y® device manufactured by X2Y® Attenuators, LLC. X2Y® devices take multi-layer capacitor technology used for filtering and insert ground, or shielding electrodes between each capacitor. The additional ground electrode plates are then connected to the sides of the component adding two ground terminals and forming a four-terminal device. The ground electrode plates provide a shorter line-to-ground capacitance that provides reduced attenuation and less unwanted inductance. The X2Y® device contains one X capacitor and two balanced Y capacitors in one integrated packaged. The two types of capacitors allow the device to operate in both a common mode and differential mode simultaneously. The X2Y® technology can be used in a number of devices including switch-mode decoupling capacitors, AC & DC leaded devices, SMT filters, planars, multicap arrays, polymer based chips, ceramic chip filters, thin film filters, thick film filters, ferrite devices, leaded MOV filter/surge devices, and planar MOV surge devices.

Besides providing filtering, the packaged circuit 10 may also be configured to relay output signals generated by various devices or provide operating instructions to various components.

Figure 2:
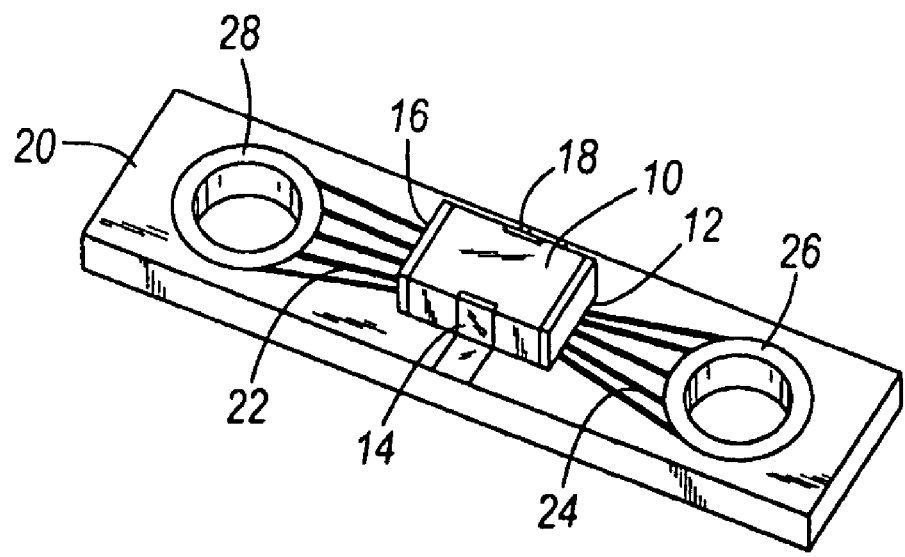
FIG. 2 illustrates the packaged circuit of FIG. 1 placed on a circuit board.

FIG. 2 illustrates the packaged circuit 10 connected to a circuit board 20. The packaged circuit 10 may be connected to the circuit board 20 by inserting pins of the packaged circuit into slots on the circuit board 20 or may be held in by brackets surrounding the packaged circuit 10 itself. The circuit board 20 also contains terminal traces 22 and 24 extending from signal terminals 12 and 16. The traces 22 and 24 provide electrical connections from the terminals 12 and 16 of the packaged circuit 10 to two secondary or interface terminals 26 and 28 arranged on the circuit board 20. In some embodiments, the traces 22 and 24 may be constructed from semiconductive material to link the signal terminals 12 and 16 of the packaged circuit 10 to the two secondary terminals 26 and 28. In general, the traces 22 and 24 may be any configuration that allows the secondary terminals 26 and 28 to be connectable to the two signal terminals 12 and 16 of the packaged circuit 10. The two secondary terminals 26 and 28 allow the terminals 12 and 16 to be displaced from the packaged circuit 10. In some embodiments, the secondary terminals 26 and 28 are the terminals that interface with a remote device rather than the signal terminals 12 and 16. In some embodiments, the secondary terminals 26 and 28 may be sized differently (e.g., larger) than the signal terminals 12 and 16 to facilitate the connection and installation of the packaged circuit 10 to another component. The packaged circuit 10 and the terminals 12 and 16 may be too small or located in problematic locations to properly connect to a remote component such as a motor and may require intricate wiring and/or soldering. The intricate wiring and/or soldering may be susceptible to vibrations, movements or other aspects of the environment causing the wires and/or soldering to break or become disconnected. The placement of the secondary terminals 26 and 28 may also be configured on the circuit board 20 so that the secondary terminals 26 and 28 are located closer to where they require connection to a device or component such as an electric motor so that connections such as wires can be shortened in length or eliminated entirely.

Figure 3:
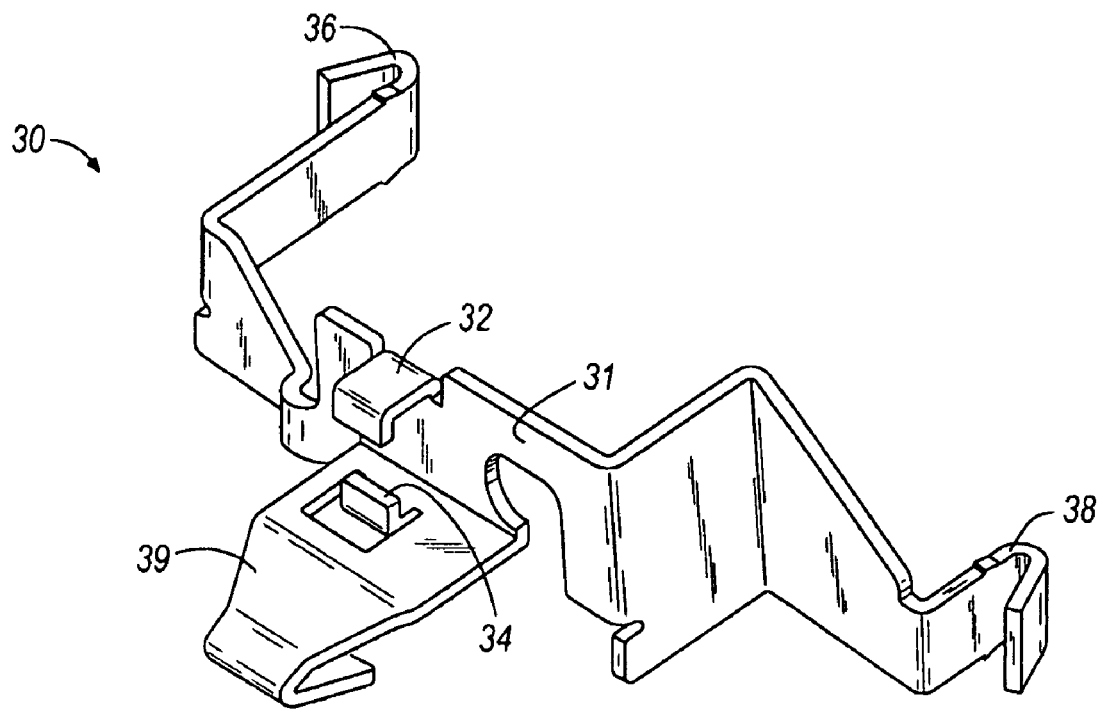
FIG. 3 is a perspective view of a bracket with two legs and three clips.

FIG. 3 illustrates a bracket 30. The bracket 30 has an upper surface 31 and two clips 32 and 34 located on each side of the upper surface 31. In some embodiments the clips 32 and 34 may be used to hold the circuit board 20 on the upper surface 31. The clips 32 and 34 may be configured to provide a snap or friction fit. The top of the clips 32 and 34 may include a lip that holds the circuit board 20 in place by pushing the top of the circuit board 20 onto the upper surface 31. The height of the clips 32 and 34 under the lip may be constructed to be the same height, or within a given margin, as the circuit board 20 to provide a secure fit under the lip.

To insert the circuit board 20 into the bracket 30, the clips 32 and 34 may be flexible and malleable and pushed open or apart in order to insert the circuit board 20. The clips 32 and 34 may "snap" back into place after the circuit board 20 has been placed under the lips. A spreading tool may also be used to move the clips 32 and 34 apart and together in order to insert and then hold the circuit board 20 on the upper surface 31 of the bracket 30. The circuit board 20 may also be slid under the clips 32 and 34 from one side of the bracket 30 and held in place through the pressure of the clips, or lips, on the circuit board 20. The circuit board 20 may also be held on the upper surface 31 using fasteners such as screws or bolts or an adhesive such as a conductive epoxy. In some embodiments, using the clips 32 and 34 may allow the circuit board 20 to be easily and quickly replaced since it snaps in and out from under the clips 32 and 34.

The bracket 30 also has two legs 36 and 38. As shown in FIG. 3, the legs 36 and 38 may have a clip at the end, similar to the clips 32 and 34, so that the bracket can be easily snapped into place on other components of the system. In alternative embodiments, the legs 36 and 38 may be attached to other components or structures by using screws, bolts, or other fasteners. The legs 36 and 38 may also be attached using an adhesive or solder. The bracket 30 may contain more or less legs or supports depending on the particular needs of the application at hand.

In some embodiments, the bracket 30 has a top support 39 to provide bracing and reinforcement for the bracket 30 like the two legs 36 and 38. The end of the top support 39 may also contain a clip like those located on the ends of the legs 36 and 38. The clip of the top support 39 may be configured to attach to a structure such as part of an electric motor in order to provide a ground path. The top support 39 may also be used as a handle or grip to place or remove the bracket 30. In some embodiments, the bracket 30 is constructed from a conductive material such as steel or other metals, conductive plastics, or the like.

Figure 4:
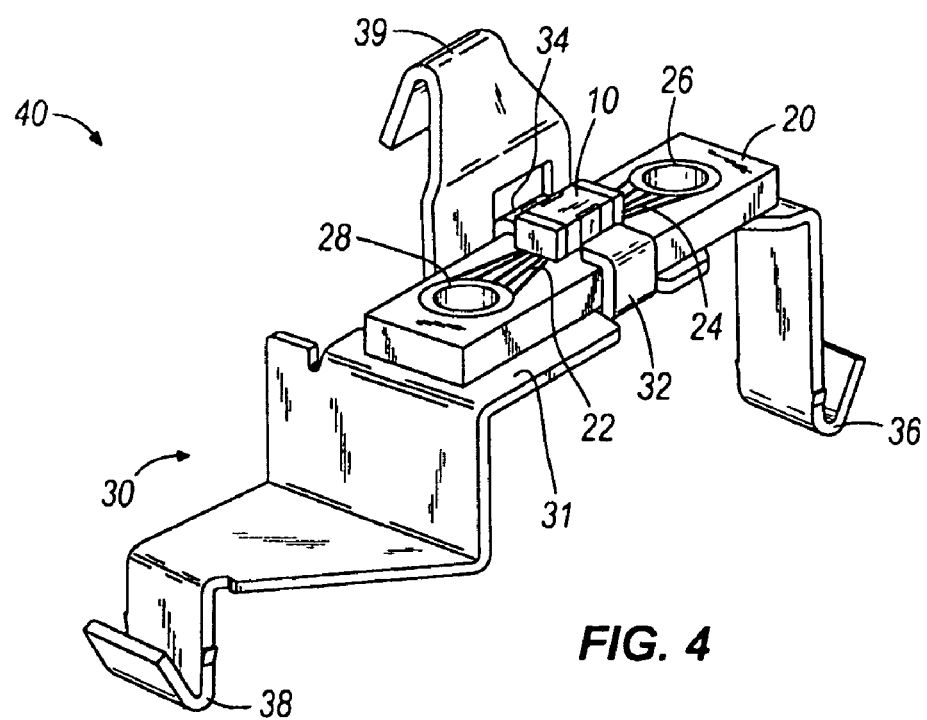
FIG. 4 is a perspective view of the bracket of FIG. 3 supporting the packaged circuit and circuit board of FIG. 2.

FIG. 4 illustrates an exemplary embodiment of a packaged circuit module 40 containing the packaged circuit 10, the circuit board 20, and the bracket 30. As shown in the figure, the two clips 32 and 34 hold the circuit board 20 in place on the upper surface 31 of the bracket 30. In embodiments where the bracket is conductive, the bracket and particularly the upper surface 31 may offer EMI shielding and ground connection to the circuit board 20 and packaged circuit 10.

Figure 5:
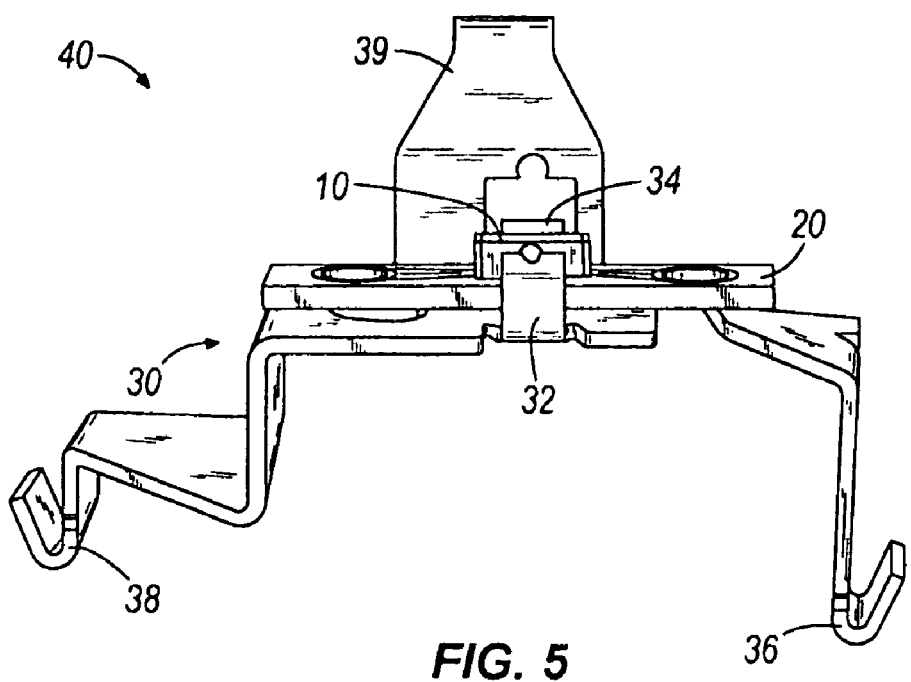
FIG. 5 is a front view of the bracket of FIG. 4 supporting the packaged circuit and circuit board of FIG. 2.
Figure 6A:
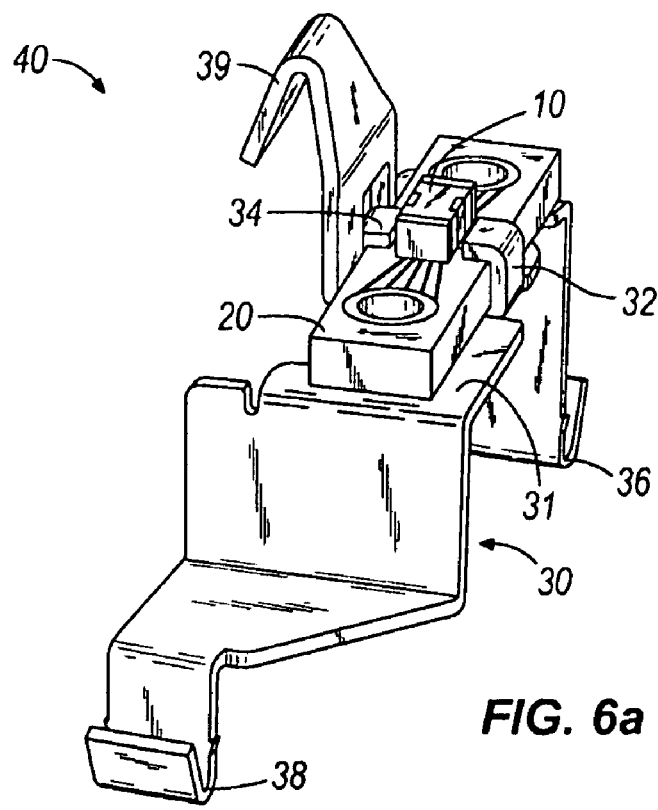
FIG. 6a is a side view of the bracket of FIG. 4.
Figure 6B:
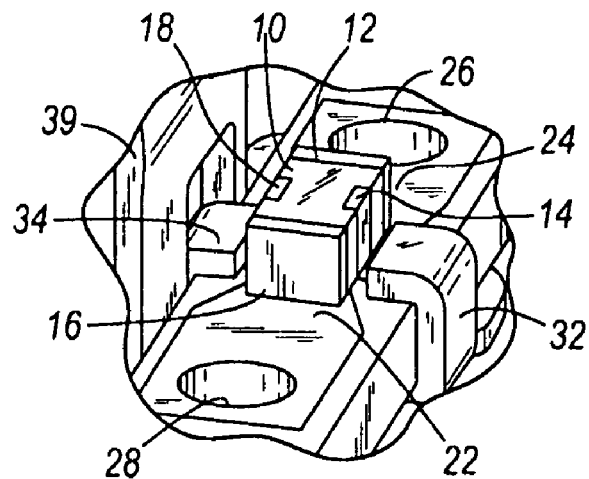

FIGS. 5 and 6 provide additional details of the packaged circuit module 40. As best seen by reference to FIGS. 6a and 6b, the circuit board 20 may be held on the bracket 30 by the two clips 32 and 34 with a friction fit. The two clips 32 and 34 are configured to hold the circuit board 20 on the upper surface 31. In some embodiments, the two clips 32 and 34 are connectable with the terminals 14 and 18 of the packaged circuit 10. As mentioned previously, the terminals 14 and 18 may be ground terminals of the packaged circuit 10. As previously described, an X2Y® device has two or more ground connections or terminals in order to reduce the line-to-ground path for capacitors. In some embodiments, where the bracket 30 is constructed from a conductive material and is attached to or interfaced with a component, device, or structure that would provide grounding through the clips of the two legs 36 and 38 and/or the clip of the top support 39, the two clips 32 and 34 may interface with the ground terminals 14 and 18 and may provide grounding for the packaged circuit 10. The clips 32 and 34 may provide grounding through a direct connection or may be soldered to the ground terminals 14 and 18 to ensure a proper connection and ultimately a proper grounding for the packaged circuit 10. The clips 32 and 34 may also be attached to the ground terminals 14 and 18 using an adhesive such as a conductive epoxy.

Figure 7:
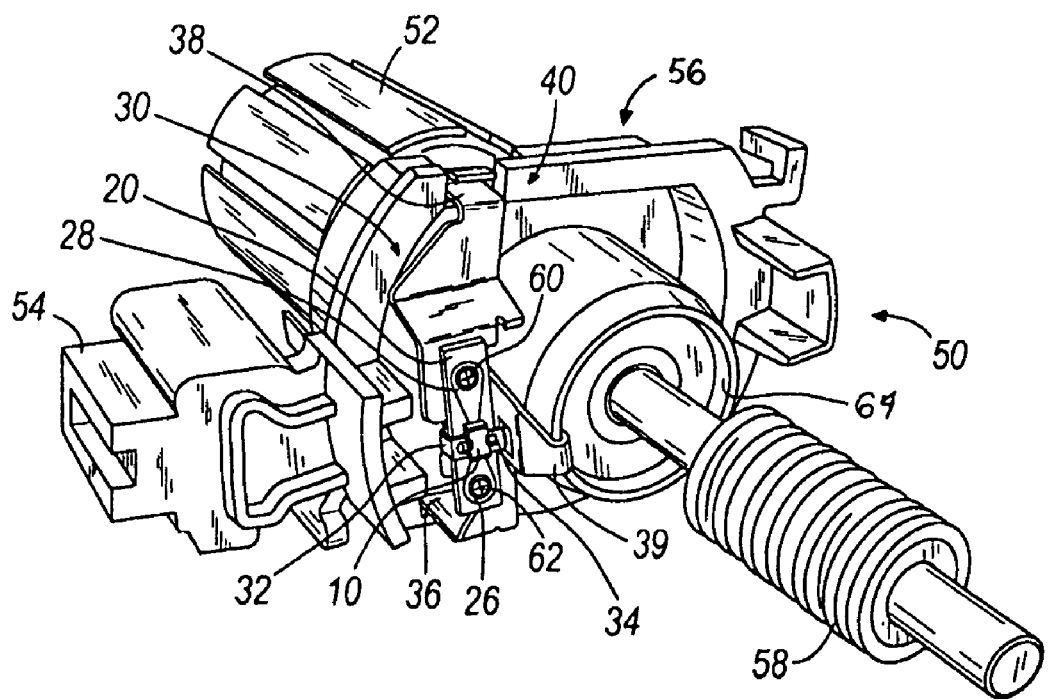
FIG. 7 illustrates one embodiment attached to an electric motor.

FIG. 7 illustrates the packaged circuit module 40 connected to an electric motor module 50. The motor module 50 includes an electric motor 52, a connector 54, a shroud 56, and a mechanical drive 58. The connector 54 may interface with a wire harness that provides power, ground, and other control connections. The shroud 56 provides shielding from debris and dust and provides separation between the electric motor 52 and the mechanical drive 58. The shroud may be constructed of an insulating or non-conductive material.

As seen in FIG. 7, the packaged circuit module 40 is located on the shroud 56. In the illustrated embodiment, the structure and design of the bracket 30, including the clips located at the ends of the legs 36 and 38 and the top support 39, snap onto the shroud 56. No additional fasteners such as screws or bolts are needed, which allows for quick replacement and reduced cost.

In some embodiments, the clip of the top support 39 may attach to a conductive retainer 64 surrounding the mechanical drive 58 in order to provide grounding. The mechanical drive 58 may create an antenna effect that generates an electromagnetic field. The clip of the top support 39 may provide a ground path that dissipates electromagnetic interference created by the mechanical drive 58.

In some embodiments, the placement of the secondary terminals 26 and 28 are configured such that the secondary terminals 26 and 28 align with the necessary component(s) and/or device(s) of the system. As seen in FIG. 7, the secondary or interface terminals 26 and 28 are located such that they automatically interface or connect with output terminals 60 and 62 protruding through the shroud 56. The output terminals 60 and 62 may represent power terminals routed from the electric motor 52. The signals from the output terminals 60 and 62 are received by the secondary terminals 26 and 28 and transmitted through the traces 22 and 24 to the signal terminals 12 and 16 of the packaged circuit 10. The signals from the output terminals 60 and 62 may represent power terminals used to operate the packaged circuit 10.

The secondary terminals 26 and 28 may also provide a connection to a device or component through direct contact, wires and/or soldering, a combination thereof, or alternate forms of connection.

Since the shroud 56 is an insulator and the bracket 30 is connected to it, the bracket 30, in particular the clips 32 and 34, can provide ground connections for the ground terminals 14 and 18 of the packaged circuit 10. As previously stated, the clips 32 and 34 may simply interface through contact with the ground terminals 14 and 18 or may be soldered to the terminals 14 and 18.

As previously described, the packaged circuit 10 may be configured to provide functionality other than electromagnetic filtering and may be located in systems other than those described. The construction of the bracket 30 may also be varied depending on the system and location of the packaged circuit 10. The bracket 30 may also consist of part of a pre-existing component and/or device. In some embodiments, clips may be added to beams or other structures of the system that could be used to attach and support the circuit board 20 containing the packaged circuit 10. The packaged circuit 10 may also contain more than four terminals and may contain more or less ground terminals and/or signal terminals. The positions of the terminals 12, 14, 16, and 18 shown are for illustrative purposes only and other configurations are possible. The circuit board 20 may also be replaced with other structures and substrates capable of supporting a packaged circuit and providing terminal traces to secondary terminals such as an insert-molded plastic substrate. The terminal traces 22 and 24 and secondary terminals 26 and 28 may also be provided by and embedded in the bracket 30 itself. The circuit board 20 may also be permanently affixed to the bracket 30.

Various features and aspects of the invention are set forth in the following claims.

The invention claimed is:

1. An EMI suppressive device configured to be electrically connected to an electric motor having a substantially non-conductive shroud and a conductive drive shaft, the device comprising:
   a packaged circuit configured to suppress electromagnetic interference and containing one or more signal terminals configured to be connected to the electric motor and one or more ground terminals configured to be connected to ground; and
   a bracket configured to support the packaged circuit and having one or more interfaces configured to interface with one or more of the one or more ground terminals of the packaged circuit, and a conductive element configured to contact the shroud and electrically connect to the drive shaft to provide a path to ground.

2. The device of claim 1, further comprising a circuit board supporting the packaged circuit and containing electrical links leading from the one or more signal terminals to one or more secondary terminals of the circuit board; and wherein the bracket is configured to support the circuit board.

3. The device of claim 1, wherein the conductive element is configured to snap fit onto the shroud.

4. The device of claim 1, wherein the bracket includes first and second legs.

5. The device of claim 1, wherein the bracket is further configured to provide the packaged circuit shielding from electromagnetic interference.

6. The device of claim 1, wherein the packaged circuit is an X2Y device having a positive terminal, a negative terminal, and one or more ground terminals.

7. The device of claim 6, wherein the interfaces of the bracket are clips configured to contact the one or more ground terminals of the X2Y device.

8. An EMI suppressive device configured to be electrically connected to an electric motor having a substantially non-conductive shroud and a conductive retainer, the device comprising:
   a packaged circuit configured to suppress electromagnetic interference and containing one or more signal terminals configured to be connected to the electric motor and one or more ground terminals configured to be connected to ground;
   a circuit board supporting the packaged circuit and containing electrical links leading from the one or more signal terminals to one or more secondary terminals; and
   a bracket configured to support the circuit board and having one or more clips configured to interface with one or more of the one or more ground terminals of the packaged circuit, and a conductive element configured to contact the shroud and the conductive retainer to provide a path to ground.

9. The device of claim 8, wherein the conductive element is configured to fit onto the shroud.

10. The device of claim 8, wherein the bracket includes first and second legs.

11. The device of claim 8, wherein the bracket is further configured to provide the packaged circuit shielding from electromagnetic interference.

12. The device of claim 8, wherein the packaged circuit is an X2Y device.

13. The device of claim 12, wherein the X2Y device includes a positive terminal, a negative terminal, and one or more ground terminals.

14. The device of claim 13, wherein the bracket includes a first terminal configured to contact the positive terminal of the X2Y device and a second terminal configured to contact the negative terminal of the X2Y device.

15. A packaged circuit module configured to be electrically connected to an electric motor having a substantially non-conductive shroud and a conductive retainer, the module comprising:
   a packaged circuit configured to suppress electromagnetic interference and containing one or more signal terminals configured to be connected to the electric motor and one or more ground terminals configured to be connected to ground;
   a first interface terminal electrically connected to one of the one or more signal terminals of the packaged circuit and configured to be connected to a first terminal of a motor; and
   a bracket configured to be connected to one of the one or more ground terminals of the packaged circuit and to a ground, the bracket having first and second legs and a conductive element configured to snap onto the shroud and contact the conductive retainer to provide a path to ground.

16. The packaged circuit module of claim 15, wherein the bracket is configured to provide electromagnetic shielding.

17. The module of claim 15, further comprising a circuit board supporting the packaged circuit and containing one or more secondary terminals spaced from the one or more signal terminals.

18. The module of claim 17, further comprising one or more electrical links connecting the one or more secondary terminals to the one or more signal terminals.

19. The module of claim 15, wherein the packaged circuit is an X2Y device having a positive terminal, a negative terminal, and first and second ground terminals.

20. The module of claim 19, wherein the bracket includes one or more clips configured to hold the circuit board in place on the bracket and to interface with the first and second ground terminals of the X2Y device.

* * * * *